(12) United States Patent
Wang (10) Patent No.: US 8,213,404 B2
(45) Date of Patent: *Jul. 3, 2012

(54) SYSTEM AND METHOD FOR ALLOCATING SESSION INITIATION PROTOCOL (SIP) IDENTIFICATIONS (IDS) TO USER AGENTS

(75) Inventor: James Wang, Richmond Hill (CA)

(73) Assignee: Research In Motion Limited, Waterloo, Ontarion (CA)

( * ) Notice: Subject to any disclaimer, the term of this patent is extended or adjusted under 35 U.S.C. 154(b) by 406 days.

This patent is subject to a terminal disclaimer.

(21) Appl. No.: 12/549,412

(22) Filed: Aug. 28, 2009

(65) Prior Publication Data

US 2009/0323678 A1 Dec. 31, 2009

Related U.S. Application Data (63) Continuation of application No. 10/943,065, filed on Sep. 16, 2004, now Pat. No. 7,599,347.

(51) Int. Cl.
 *H04J 3/24* (2006.01)
(52) U.S. Cl. ........ 370/349; 709/221; 709/227; 709/228; 709/229
(58) Field of Classification Search .................. 370/349; 709/221, 227, 228, 229
See application file for complete search history.

(56) References Cited

U.S. PATENT DOCUMENTS

| | | | |
|---|---|---|---|
| 6,434,143 B1 | 8/2002 | Donovan | 370/356 |
| 6,601,099 B1 | 7/2003 | Corneliussen | 709/224 |
| 6,681,252 B1 | 1/2004 | Schuster et al. | 709/227 |
| 6,704,396 B2 | 3/2004 | Parolkar et al. | 379/88.17 |
| 2002/0103850 A1 | 8/2002 | Moyer et al. | 709/202 |
| 2002/0136370 A1 | 9/2002 | Gallant | 379/90.01 |
| 2003/0112804 A1 | 6/2003 | Kamarainen et al. | 370/390 |
| 2003/0174693 A1 | 9/2003 | Gallant et al. | 370/352 |
| 2003/0231626 A1 | 12/2003 | Chuah et al. | 370/389 |
| 2004/0037406 A1 | 2/2004 | Gourraud | 379/202.01 |
| 2004/0062375 A1 | 4/2004 | Wang et al. | 379/219 |
| 2004/0105433 A1 | 6/2004 | Seo | 370/352 |
| 2004/0162892 A1* | 8/2004 | Hsu | 709/221 |
| 2004/0196821 A1* | 10/2004 | Haddad et al. | 370/349 |

FOREIGN PATENT DOCUMENTS

WO 01/31472 3/2001

OTHER PUBLICATIONS

Droms, R., "RFC 1541—Request for Comments, Dynamic Host Configuration Protocol," Network Working Group Request for Comments, Mar. 1997, pp. 1-45.

Rosenberg, J., et al., "URI Leasing in the Session Initiation Protocol (SIP) draft-rosenberg-sipping-lease-00," Internet Draft, Feb. 12, 2003, pp. 1-23.

(Continued)

*Primary Examiner* — Gerald Gauthier
*Assistant Examiner* — Simon King
(74) *Attorney, Agent, or Firm* — Allen, Dyer, Doppelt, Milbrath & Gilchrist, P.A.

(57) ABSTRACT

A communications system includes a Session Initiation Protocol (SIP) user agent. A server communicates with the SIP user agent and allocates an SIP ID for the user agent for subsequent communications using SIP. A database can be associated with the server and contain data relating to free SIP ID's that can be allocated to the SIP user agent and allocated SIP ID's.

12 Claims, 4 Drawing Sheets

OTHER PUBLICATIONS

Rosenberg, J., et al., "Obtaining and Using Globally Routable User Agent (UA) URIs (GRUU) in the Session Initiation Protocol (SIP) draft-ietf-sip-gruu-02," Internet Draft, Jul. 2, 2004, pp. 1-29.

Rosenberg, J., et al., "SIP: Session Initiation Protocol," Request for Comments 3261, Jun. 2002, pp. 1-236.

Zou et al., "Prototyping SIP-Based VoIP Technology Services in Java," 2000, vol. 2, pp. 1395-1399, Communication Technology Proceedings, 2000, WCC-ICCT 2000, www.ifip.or.at/con2000/icct2000/icct440.pdf.

* cited by examiner

SYSTEM AND METHOD FOR ALLOCATING SESSION INITIATION PROTOCOL (SIP) IDENTIFICATIONS (IDS) TO USER AGENTS

RELATED APPLICATION

This application is a continuation of Ser. No. 10/943,065 filed on Sep. 16, 2004 now U.S. Pat. No. 7,599,347, the disclosure of which is hereby incorporated by reference in its entirety.

FIELD OF THE INVENTION

The present invention relates to communications systems and, more particularly, the present invention relates to Internet Protocol (IP) communications systems that use Session Initiation Protocol (SIP).

BACKGROUND OF THE INVENTION

The communications systems that use Internet Protocol (IP) and related protocols have grown in the last decade such that even the most remote individuals often can obtain access to these networks. As well known to those skilled in the art, the internet and related communication technologies are session based and are not connection based communications systems, for example, as in the Public Switched Telephone System (PSTN). New communications protocols are now being defined to add new techniques for handling voice and data calls in these Is telecommunications networks.

One recent and popular communications protocol is the Session Initiation Protocol (SIP), which is a signalling protocol for initiating, managing and terminating voice, data and video sessions across packet networks that typically use the Internet Protocol, for example, the ubiquitous Internet. SIP was developed by the Internet Engineering Task Force (IETF) and is specified in IETF Request For Comments (RFC) 2543 and the subsequent 3261 standard, the disclosures which are hereby incorporated by reference in their entirety. SIP is a standard protocol for initiating interactive user sessions that could involve multimedia, including video, voice, chat, gaming and virtual reality. SIP establishes a session and negotiates the capabilities for the session, including the modification or termination of the session. Its open standard is scalable and of general purpose, using a location-independent address system feature in which a called party can be reached based on the party's name and redirection parameters. SIP is text-based, similar to HTTP and SMTP, and works in the application layer of the Open Systems Interconnection (OSI) communications model. As a result, SIP not only can establish multimedia sessions, but also SIP can establish internet telephony calls. Because SIP supports name mapping and redirection, users can initiate and receive communications from any location.

SIP is an efficient request-response protocol, in which requests typically originate from clients, and responses typically originate from servers. Uniform Resource Locators (URL's) or Uniform Resource Identifiers (URI's) can be used to identify a user agent, but E.164 telephone number addressing can also be supported. Various SIP requests are sent through a transport protocol, for example, the User Datagram Protocol (UDP), the Simple Control Transport Protocol (SCTP), or the Transfer Control Protocol (TCP).

The SIP architecture usually includes user agents, divided into a user agent client and user agent server, typically as an application software program or a separate hardware device, for example, a hand-held waveless communications device. The user agent sends SIP requests, which a server accepts for response. Responses are transmitted back to the request. The user agent server would typically contact the client when an SIP request is received and return a response on behalf of a user agent. The SIP protocol is operative to accept, reject or redirect the request.

The SIP architecture includes proxy, redirect or registrar servers. A proxy server is an intermediary server that operates as both a server and a client. It can make requests on behalf of other clients. A redirect server accepts an SIP request, maps the address into zero or more addresses, and returns addresses to a client. The SIP redirect server usually does not initiate SIP requests or accept calls. The registrar server accepts register requests by receiving client transmitted register packets. SIP identifications (ID's) are stored on this registrar server, which contains the location of all user agents within a domain. A registrar server can retrieve and send IP addresses, including unique SIP ID's, and other pertinent information to an SIP proxy server. Typically REGISTER requests are generated by clients and establish or remove a mapping between an SIP address. These requests can retrieve existing mappings. The SIP system typically processes for a specific set of domains and can use a location database to store and retrieve location information. Different protocols can be used to contact the SIP service including Lightweight Directory Access Protocol (LDAP), Remote Authentication Dial-In-User Service (RADIUS) for authentication, and Real-Time Transport Protocol (RTP) for real-time transmission, as non-limiting examples.

A drawback of current communications using SIP involves a user agent requiring manual entry of a SIP ID on a SIP server. For example, if 1,000 SIP-based devices are purchased, they must be provisioned with an SIP ID. There are typically two tasks to perform before the device is SIP-enabled. First, the server must contain an entry that associates to the SIP ID a unique identifier for the device, for example, an IP address, PIN number or e-mail address, This mapping usually is manually entered. On the device or software side, a user (or the software) must also know its own SIP ID, which typically is manually entered before any registration occurs with the SIP registrar server. Also, in some domains, a larger number of potential user agents may exist, which outnumber the availability of SIP ID's.

SUMMARY OF THE INVENTION

It is therefore an object of the present invention to remove the requirement for manually entering SIP ID's on an SIP server.

It is yet another object of the present invention to remove the requirement for a user agent to know its own SIP ID in order to communicate using SIP.

It is still another object of the present invention to allocate a limited number of SIP ID's to a larger group of user agents, which are not always connected.

In accordance with the present invention, SIP ID's are dynamically allocated to a user agent. For example, a server, operative as a Dynamic SIP ID Allocation (SPID) server or a SIP server, for example, a registrar server as a non-limiting example, would query a look-up table of free SIP ID's. When contacted by a user agent for a SIP ID, this server would query the look-up table and allocate to the user agent one of the free SIP ID's. Once the SIP ID is allocated, it can be moved to another table containing a list of SIP ID's currently in use. When the user agent is no longer connected to the network and using SIP, the SIP ID can be returned to a free SIP ID list.

This system and method allows large scale implementation of the invention to many potential user agents.

In accordance with one aspect of the present invention, the communication system includes a Session Initiation Protocol (SIP) user agent and a server that communicates with the SIP user agent and allocates an SIP ID for the user agent for subsequent communications using SIP. A database is associated with the server and contains data relating to free SIP ID's that can be allocated to a SIP user agent. The database also includes data of allocated SIP ID's. In another aspect of the present invention, the SIP ID comprises a unique identifier for the SIP user agent. The SIP ID can be associated with an IP address, PIN number or e-mail address in a non-limiting example of the present invention.

In another aspect of the present invention, the server allocates the SIP ID to another user agent after a communication session is completed by the user agent using the originally allocated SIP ID. The user agent can be a hardware or software user agent. The server could be a SIP registrar server, or a non-SIP server. The user agent is typically operative for issuing a request for a SIP ID to the server, receiving the SIP ID from the server, and issuing a REGISTER command for registering and communicating by using SIP ID.

A method of the present invention is also set forth in detail.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously removes the requirement for manually entering SIP ID's on an SIP server and for a user agent to know its own SIP ID. It also allows the allocation of a limited number of SIP ID's to a larger group of user agents, who are not always connected at the same time.

Instead of using a statically assigned SIP ID, a dynamically allocated SIP ID is used and leased to a user agent by a Dynamic SIP ID Allocation (DSIA) server, which could be a SIP server or non-SIP server. For example, the DSIA server could be associated with a registrar server or other SIP server, or be a stand-alone server as part of a different network or outside the network using SIP. The DSIA server includes a database having a look-up table of free SIP ID's. When contacted by a user agent for an SIP ID, the DSIA server would query the look-up table and allocate one of its free SIP ID's to be temporarily used by the user agent. Once the SIP ID is allocated, it could be moved to another table containing a list of SIP ID's currently in use. When the user agent is no longer connected to the network and using SIP, the SIP ID would be returned to a free SIP ID table to be leased again to another user agent.

Figure 1:
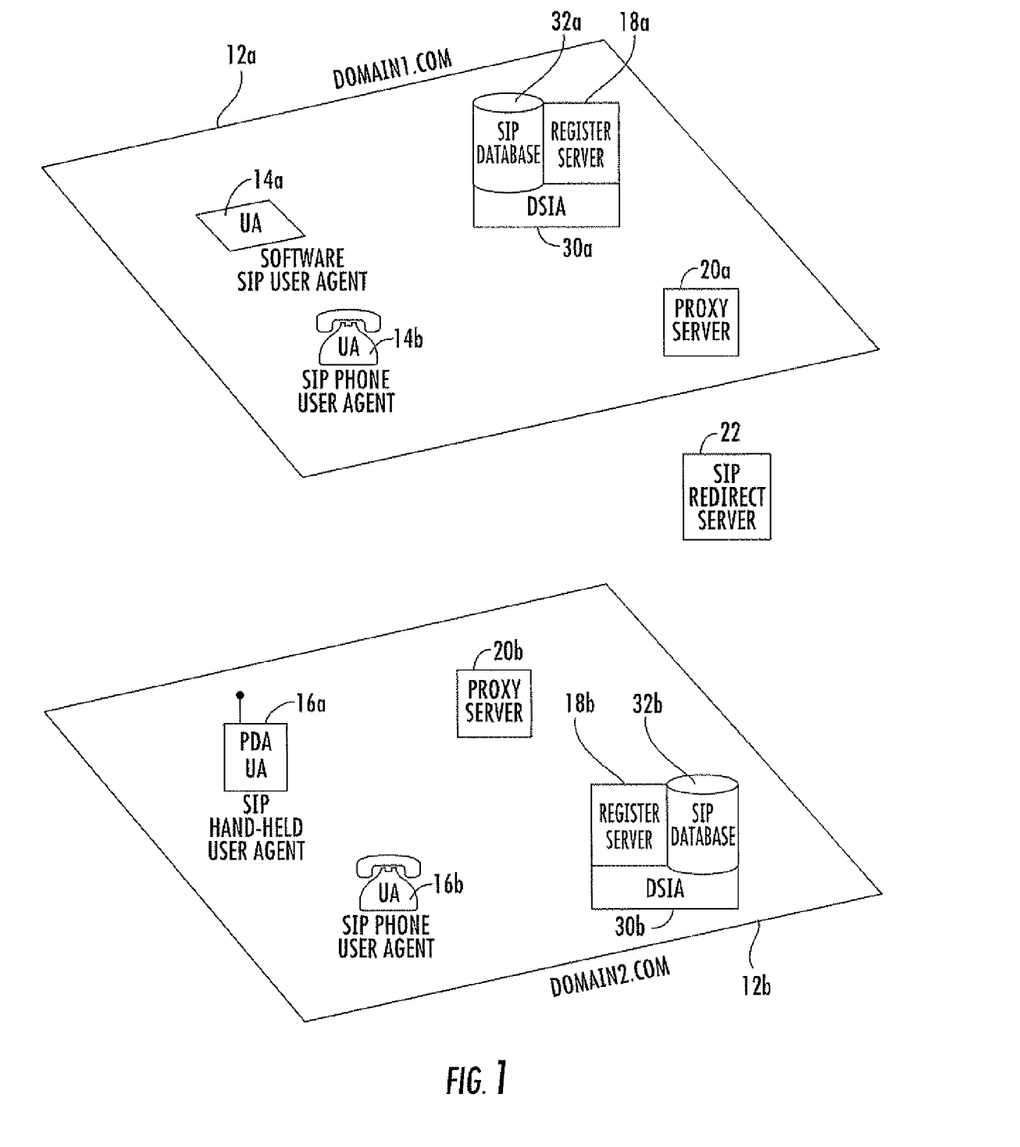
FIG. 1 is an overall block diagram of a networked communication system using SIP and showing the DSIA server of the present invention for allocating temporarily a SIP ID for the user agent for subsequent communications using SIP.

FIG. 1 shows a fragmentary block diagram of a networked communications system 10 that uses SIP for its communications protocol. Two domains, domain1.com and domain2.com 12a, 12b are illustrated in this non-limiting example. Each domain 12a, 12b has one or more SIP user agents 14a, 14b, 16a, 16b. Each domain includes a registrar server 18a, 18b that can be operative as a registrar and location service. Each domain also includes an SIP proxy server 20a, 20b. A SIP redirect server 22 is operative with the SIP communications system. This server 22 could be included within each domain or be separate from the domains as illustrated. In this non-limiting example, each domain 12a, 12b includes a Dynamic SIP ID Allocation (DSIA) server 30a, 30b that could be a separate stand-alone server or associated with a particular domain registrar server 18a, 18b. For purposes of illustration, only a DSIA server 30a, 30b is shown associated with each registrar server 18a, 18b. It should be understood that only one DSIA server could be used for all domains, but in this illustrated example, a DSIA server 30a, 30b is contained in each domain. The DSIA server 30a, 30b could be associated with other SIP servers also. Each DSIA server 30a, 30b is able to query a database 32a, 32b that stores tables of free and allocated SIP ID's.

The SIP user agents 14a, 14b, 16a, 16b could be a software client residing on a computer or hand-held device, or a hardware device itself, for example, a SIP phone, a SIP PDA, Blackberry device, or other devices that are enabled to use the present invention and are DSIA capable. The software client could reside in a laptop or other personal computer, as non-limiting examples.

For purposes of this non-limiting example, a functional description of one method of operation of the present invention is set forth. For initial registration of a user agent in accordance with the present invention, the user agent must be capable of having a dynamic SIP ID allocated to it, i.e., a DSIA-capable user agent with a DSIA client, sends a request for a SIP ID to the DSIA server, which returns a SIP ID to the DSIA client. The client passes it up to the user agent. It should be understood that the DSIA client could sit on a lower layer and pass the information up to the user agent on the same device or machine. The user agent would take this information and register its temporary SIP ID with the SIP registrar server. Thus, the user agent in effect has a "lease" on the SIP ID, which can later be released.

In the illustrated embodiment, if the SIP user agent, for example, as a SIP enabled phone in the first domain, wanted to communicate with a SIP user agent at the second domain, for example, a multimedia handset or other handheld device, the user would invite the second user agent by issuing an appropriate INVITE command. The SIP proxy server in the first domain 12a would recognize that the other user agent is outside its domain and query the SIP redirect server 22 for the IP address of the other user agent. The redirect server 22 would transmit the contact information to the SIP proxy server, which forwards the SIP session invitation, i.e., the INVITE command, to the SIP proxy server 20b in the second domain 12b, which delivers the invitation to the second user agent. This in turn would allow the second user agent to forward an acceptance along the same path.

Even though an initial registration occurs with the use of the present invention, and an initial contact is made by the user agent to obtain a SIP ID, the overall function of SIP has not changed when the invention is implemented. The SIP infrastructure is still operable with different servers acting as proxies, gateways, registrars, and redirectors, and can bridge multiple devices or environments, including linking to a Public Switched Telephone Network (PSTN) or a corporate PBX, allowing Voice over Internet (VoIP). Straightforward messages can still be used to set-up, modify, and terminate calls including the various SIP messages: INVITE, ACK, CANCEL, REGISTER, BYE, OPTIONS, and INFO, as non-limiting examples. Different responses could include: Informational (1XX), Successful (2XX), Redirection (3XX), Request failure (4XX), Server failure (5XX), and Global failure (6XX), as non-limiting examples. SIP is advantageous over H.323 as a legacy technology because of its inherent simplicity and media-blending services, for example, internet telephony.

The SIP messages are typically text based, and can reuse MIME type description in a manner that e-mail clients do. SIP can reuse existing internet services and protocols, and have extensions that are easily defined. The present invention is operable with all aspects of SIP including interfaced, SIP-enabled end points, cost/session control, media service control, service control, service creation/authoring, intelligent network/intelligent protocol internetworking, general events subscription/notification, SIP-enabled instant messaging, and wireless multimedia protocol. A user agent can access services from an SIP-enabled endpoint whether SIP CPL, CGI, or Servlex. SIP is operative with Parlay/open services architecture (OSA); JAIN and advanced intelligent network application protocol (AINAP); intelligent network application protocol (INAP); PINTs and SPIRITs services. Stateless and stateful proxies are operative with the present invention.

In accordance with the present invention, a proxy server can do different types of address resolution, including determining a target-set, for example, resolving request SIP destination addresses to a set of SIP addresses that are mapped, and DNS resolution. Different types of forking are operable, including parallel forking, sequential forking and mixed forking by using the proxy server and a redirect server.

Different SIP-based services are operable, including ad-hoc conferencing, chat, enhanced messaging, enhanced voice mail, find-me, location-based services, picture messaging, push-to-talk, session-based transfers, infotainment, and other services as suggested by those skilled in the art.

Any services enabled by SIP can be applied to mobile services. SIP is operable with third generation mobile systems and with a call state control function (CSCF) that could be equivalent to a SIP server. SIP could be interworked with the Wireless Application Protocol (WAP) by mapping between SIP and cellular signalling protocols, A WAP mobile client could send an instant message to a SIP client. Different application programs on the interfaces, such as the call processing language (CPL), could be used for SIP as an XML-based scripting language for describing and controlling call services. SIP could also be implemented on network servers or user agent servers.

In the worldwide web, the common gateway interface (CGI) could be used for programming web services and used for service creation in a SIP environment. The CGI script could be written in PERL, TCL, C, C++, or JAVA. SIP servlets can be used that are similar to HTTP servlets and written in JAVA. Also, SIP API's could be developed with a JAIN initiative, including JAIN SIP, JAIN LITE, and SIP servlets.

Because SIP is somewhat equivalent to the Q.931 and H.225 components of H.323, both SIP and H.323 could be used as signalling protocols in IP networks. Although they are not peers, SIP and H.323 could coexist in converged networks, even though SIP resides both in the end points and above the signalling network, acting as a service intelligence. SIP application servers could reside with soft switches in the IP central office even though MGCP/MEGACO would control multimedia gateways across the network in a converged network.

Figure 2:
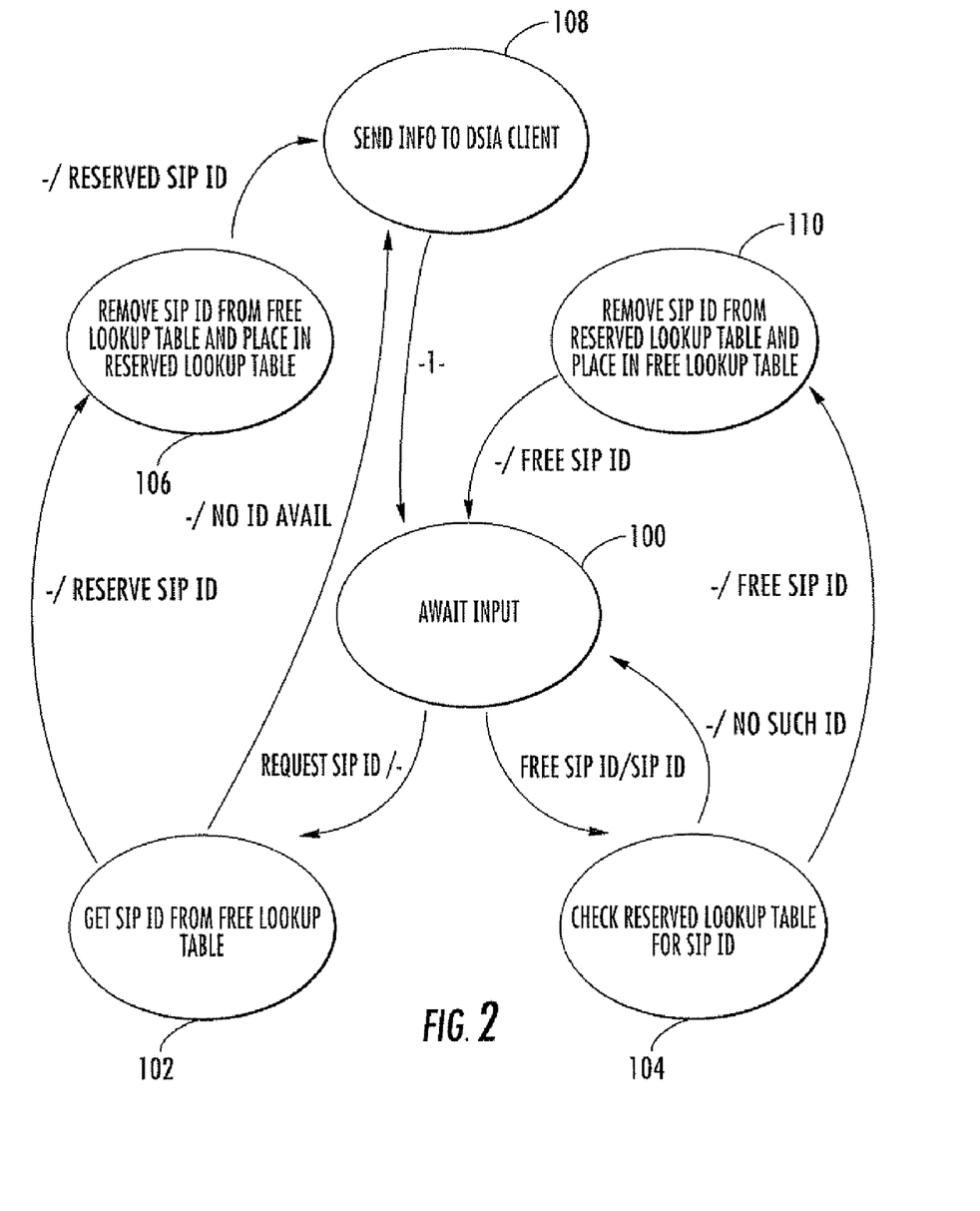
FIG. 2 is a server-side state diagram as an example of the present invention.

Referring now to FIG. 2, the server-side state diagram of the present invention is illustrated. Different states are shown. The centrally illustrated state 100 awaits input. The SIP ID can be obtained from the free look-up table as shown in state 102 with a request SIP ID. A reserved look-up table for the SIP ID can be checked as shown at state 104. The SIP ID can be removed from the free look-up table at state 106 and placed in the reserved look-up table. This information is sent to the DSIA client as shown at state 108. If the reserved look-up table is checked for the SIP ID at state 102, the SIP ID can be removed from the reserved look-up table and placed in a free look-up table as shown at state 110.

Figure 3:
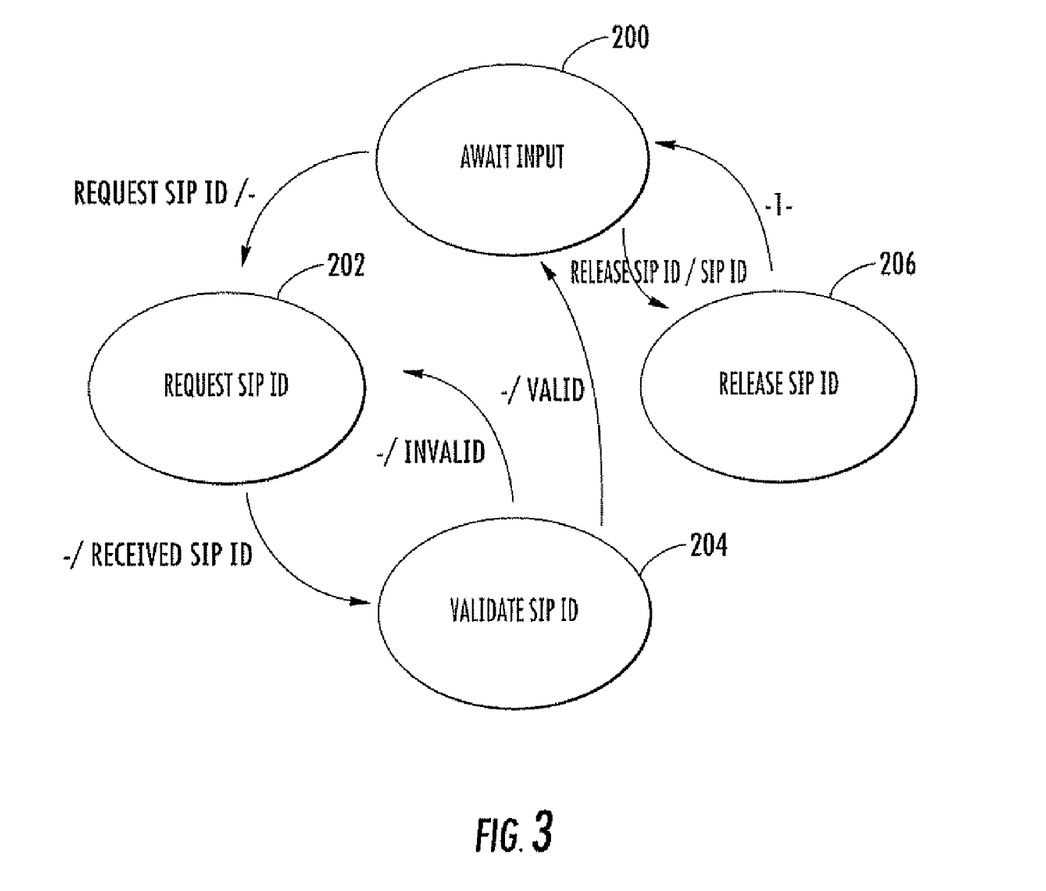
FIG. 3 is a client-side state diagram as an example of the present invention.

FIG. 3 shows the DSIA client-side state diagram. The illustrated state shows the system state 200 that awaits input. A second state 202 requests the SIP ID, which is validated at state 204. The release SIP ID State 206 permits the SIP ID to be released once a user agent is finished.

An exemplary hand-held mobile wireless communications device 1000 that can be used in the present invention is further described in the example below with reference to FIG. 4. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 4:
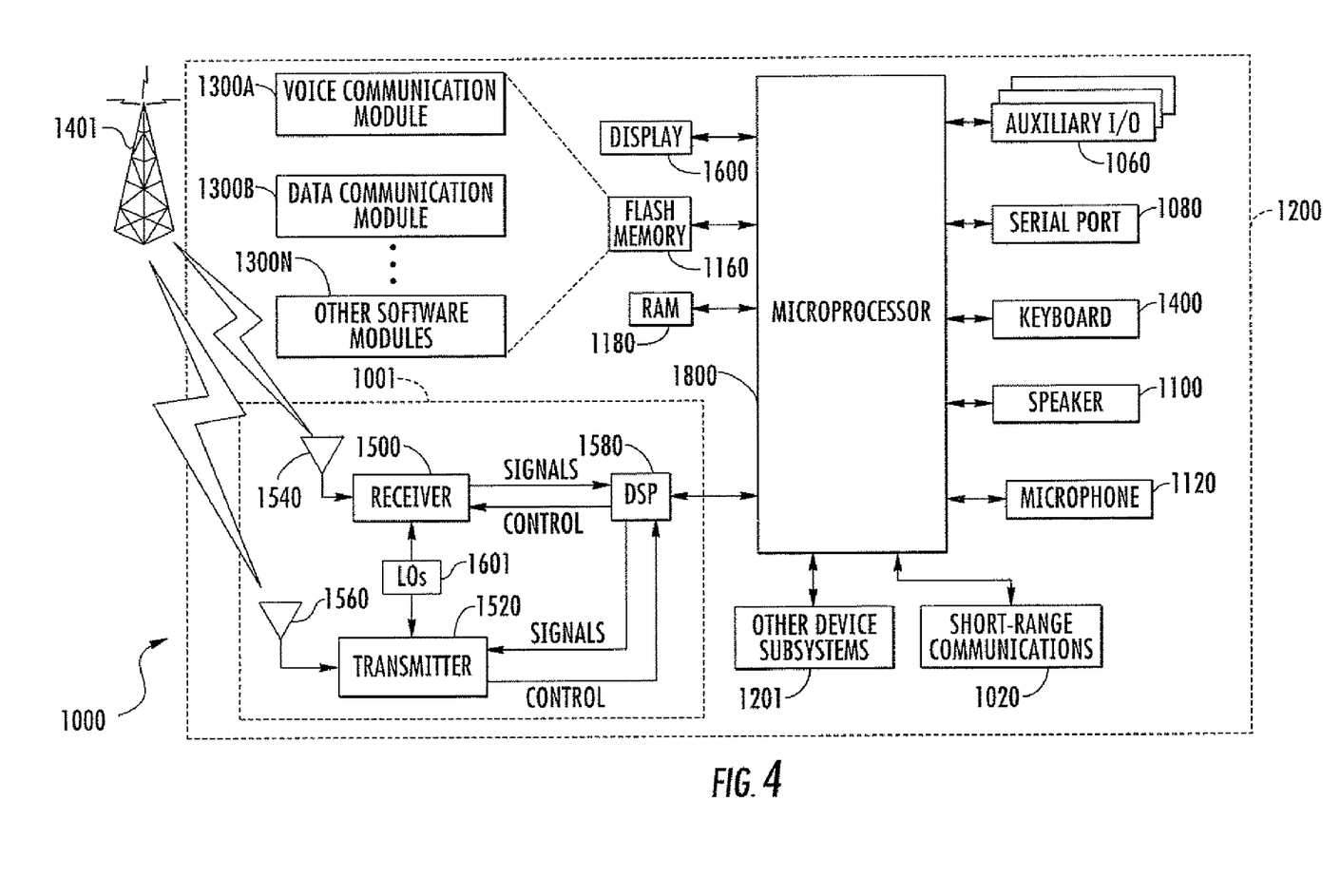
FIG. 4 is a schematic black diagram illustrating an exemplary mobile wireless communications device for use in the present invention.

In addition to the processing device 1800, other parts of the mobile device 1000 are shown schematically in FIG. 4. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIN is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system. Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of enabling communication on an Internet Protocol based network which comprises:

establishing a communications connection between a communications device and a server via a network;

querying a database associated with the server, the database containing data relating to free Session Initiation Protocol ID's that are available to be allocated to the communications device and data relating to allocated Session Initiation Protocol ID's, for determining a free Session Initiation Protocol ID that can be allocated to the communications device;

allocating the determined free Session Initiation Protocol ID for use by the communications device;

moving the determined free Session Initiation Protocol ID to the data relating to allocated Session Initiation Protocol ID's; and after the communications device to which the Session Initiation Protocol ID was originally allocated has completed a communications session using SIP, returning the Session Initiation Protocol ID to the data relating to free Session Initiation Protocol ID's for use by another communications device.

2. The method according to claim 1, wherein the communications device comprises a portable communications device.

3. The method according to claim 1, which further comprises allocating a unique identifier for the communications device.

4. The method according to claim 3, which further comprises allocating from the server to the communications device a Session Initiation Protocol ID associated with an IP address, PIN number, or email address.

5. The method according to claim 1, wherein the communications device comprises one of a hardware or a software agent as a user agent.

6. The method according to claim 1, wherein the server is operative as a Session Initiation Protocol registrar server.

7. A communications system comprising:
- a server that is operable for communicating with a communications device;
- a database associated with the server, the database comprising data relating to free Session Initiation Protocol ID's that are available to be allocated to the communications device and data relating to allocated Session Initiation Protocol ID's;
- wherein the server is operative for querying the database and determining a free Session Initiation Protocol ID that can be allocated to the communications device;
- allocating the determined free Session Initiation Protocol ID for use by the communications device;
- moving the determined free Session Initiation Protocol ID to the data relating to allocated Session Initiation Protocol ID's; and
- after the communications device to which the Session Initiation Protocol ID was originally allocated has completed a communications session using Session Initiation Protocol, returning the Session Initiation Protocol ID to the data relating to free Session Initiation Protocol ID's for use by another communications device.

8. The communications system according to claim 7, wherein the communications device comprises a portable communications device.

9. The communications system according to claim 7, which further comprises allocating a unique identifier for the communications device.

10. The communications system according to claim 9, which further comprises the server being operative to allocate from the server to the communications device a Session Initiation Protocol ID associated with an IP address, PIN number or email address.

11. The communications system according to claim 7, wherein the communications device comprises one of a hardware or a software agent as a user agent.

12. The communications system according to claim 7, wherein the server is operative as a Session Initiation Protocol registrar server.

* * * * *